US012140296B2

(12) United States Patent
Lin

(10) Patent No.: US 12,140,296 B2
(45) Date of Patent: Nov. 12, 2024

(54) TELESCOPIC LIGHTING STRUCTURE

(71) Applicant: Che-Hsien Lin, Chiayi County (TW)

(72) Inventor: Che-Hsien Lin, Chiayi County (TW)

( * ) Notice: Subject to any disclaimer, the term of this patent is extended or adjusted under 35 U.S.C. 154(b) by 0 days.

(21) Appl. No.: 18/490,195

(22) Filed: Oct. 19, 2023

(65) Prior Publication Data

US 2024/0133544 A1 Apr. 25, 2024
US 2024/0230072 A9 Jul. 11, 2024

(30) Foreign Application Priority Data

Oct. 24, 2022 (TW) ................................ 111211595

(51) Int. Cl.

*F21V 21/22* (2006.01)
*F21L 4/08* (2006.01)
*F21S 9/02* (2006.01)
*F21V 21/08* (2006.01)
*F21V 23/06* (2006.01)
*F21W 103/30* (2018.01)
*F21Y 103/10* (2016.01)

(52) U.S. Cl.

CPC .......... *F21V 21/22* (2013.01); *F21V 21/0816* (2013.01); *F21V 21/0824* (2013.01); *F21V 23/06* (2013.01); *F21L 4/08* (2013.01); *F21S 9/022* (2013.01); *F21W 2103/30* (2018.01); *F21Y 2103/10* (2016.08)

(58) Field of Classification Search

CPC .. F21V 21/22; F21V 21/0816; F21V 21/0824; F21V 23/06; F21Y 2103/10; F21W 2103/30; F21L 4/08; F21S 9/022
See application file for complete search history.

(56) References Cited

U.S. PATENT DOCUMENTS

2009/0097263 A1* 4/2009 Ko ........................... F21L 4/04
362/372

OTHER PUBLICATIONS

Yang, CN 107607777, Jan. 2018 (Year: 2018).*
Shen, CN 203131450, Aug. 2013 (Year: 2013).*
Xu, CN 204719306, Oct. 2015 (Year: 2015).*
Zhang, CN 213333600, Jun. 2021 (Year: 2021).*
Su, CN 2735457, Oct. 2005 (Year: 2005).*

* cited by examiner

*Primary Examiner* — Mary Ellen Bowman
(74) *Attorney, Agent, or Firm* — Rosenberg, Klein & Lee

(57) ABSTRACT

A telescopic lighting structure includes a telescopic rod composed of a rod body and a detachable terminal rod. The terminal rod has a light-emitting module and a power switch. The light-emitting module and the power switch do not protrude beyond the surface of the terminal rod, thus the terminal rod can be completely retracted into the rod body, making it easy to store and protect the light-emitting module. A power supply assembly is provided inside the terminal rod. The power supply assembly controls the connection with the light-emitting module through the power switch. Through this structural design in which the power supply assembly, the light-emitting module and the power switch are arranged on the terminal rod, the telescopic rod can be stretched so that the light-emitting module has a higher lighting height. Further, the terminal rod can be removed to provide illumination alone, thereby increasing the scope of application.

19 Claims, 11 Drawing Sheets

TELESCOPIC LIGHTING STRUCTURE

FIELD OF THE INVENTION

The present invention relates to a telescopic lighting structure, and more particularly to a telescopic lighting structure that can be used as a cane to provide illumination when walking, and can also be separately used for other lighting applications.

BACKGROUND OF THE INVENTION

Taiwanese Utility Model Publication No. M289295 discloses a light-emitting cane, comprising a light-emitting rod connected to the bottom of a telescopic cane. A light-emitting member is provided between the light-emitting rod and the bottom end of the cane. The light-emitting member is connected to a battery through a circuit board via wires. When the light-emitting member is energized, it generates light to be uniformly diffused outwards through the light-emitting rod, so as to form the light of warning and illumination.

Taiwanese Utility Model Publication No. M531770 discloses a multifunctional cane structure. A lighting device is provided at the bottom of a cane body unit. The lighting device is connected to a mobile power device located inside the cane body unit. When the lighting device is powered on to generate light, it can directly provide a lighting function at the bottom of the cane body unit.

The light-emitting member (or lighting device) in the above-mentioned prior art are all connected to the battery (or mobile power supply device) by wires. Therefore, the light-emitting member (or lighting device) cannot be disassembled from the cane (or cane body unit) and used separately, resulting in a limitation of application. Besides, when not in use, the light-emitting member (or lighting device) cannot be completely retracted into the cane (or cane body unit). It is susceptible to damage due to improper impact (or weather conditions).

Taiwanese Utility Model Publication No. M529509 discloses an emergency warning cane. A grip is attached to one end of a cane body. A lighting lamp and a hand-operated charger are provided on the grip. The hand-operated charger can charge a battery. The battery can supply the power required by the lighting lamp. When the lighting lamp is powered on, it can generate illumination light at the grip.

However, the lighting lamp of this conventional art is mounted to one end of the grip and shines in a fixed direction. In practice, it is not possible to separate the lighting lamp from the grip and use it independently. Due to the shape and structure of the grip, the lighting lamp assembled in the grip is not suitable for other lighting application, thus limiting the overall scope of application.

Accordingly, the inventor of the present invention has devoted himself based on his many years of practical experiences to solve these problems.

SUMMARY OF THE INVENTION

The primary object of the present invention is to provide a telescopic lighting structure, comprising a telescopic rod composed of a rod body and a detachable terminal rod. The terminal rod is selectively telescoped into the rod body. A light-emitting module is disposed on the terminal rod. The light-emitting module does not protrude beyond the surface of the terminal rod. A (rechargeable) power supply assembly is provided inside the terminal rod. The power supply assembly controls the connection with the light-emitting module through a power switch. Through this structural design in which both the power supply assembly and the light-emitting module are arranged on the terminal rod, the telescopic rod can be stretched so that the light-emitting module has a higher lighting height to meet the warning or lighting needs of different occasions. Further, the terminal rod can be disassembled to provide illumination alone, thereby increasing the scope of application and improving economic benefits.

Preferably, the terminal rod is a light-pervious structure, and the light-emitting module is disposed inside the terminal rod. With the light-pervious or transparent characteristics of the terminal rod, the light of the light-emitting module can be directly projected outwards, thereby simplifying the overall structural design and development costs.

The power switch is disposed on an end face of one end of the terminal rod, close to the rod body, or is disposed on the peripheral side of the terminal rod and does not protrude beyond the surface of the terminal rod, such that the power switch can be completely received in the rod body along with the terminal rod for storage and protection.

The terminal rod has a tip for easy insertion into soft ground to provide ground illumination of a fixed area.

A sling ring is provided on the terminal rod, which can be hung at a predetermined height to provide a wider range of illumination in all directions, thereby creating a wider scope of application.

Embodiments of the present invention will now be described, by way of example only, with reference to the accompanying drawings.

DETAILED DESCRIPTION OF THE PREFERRED EMBODIMENTS

Figure 1:
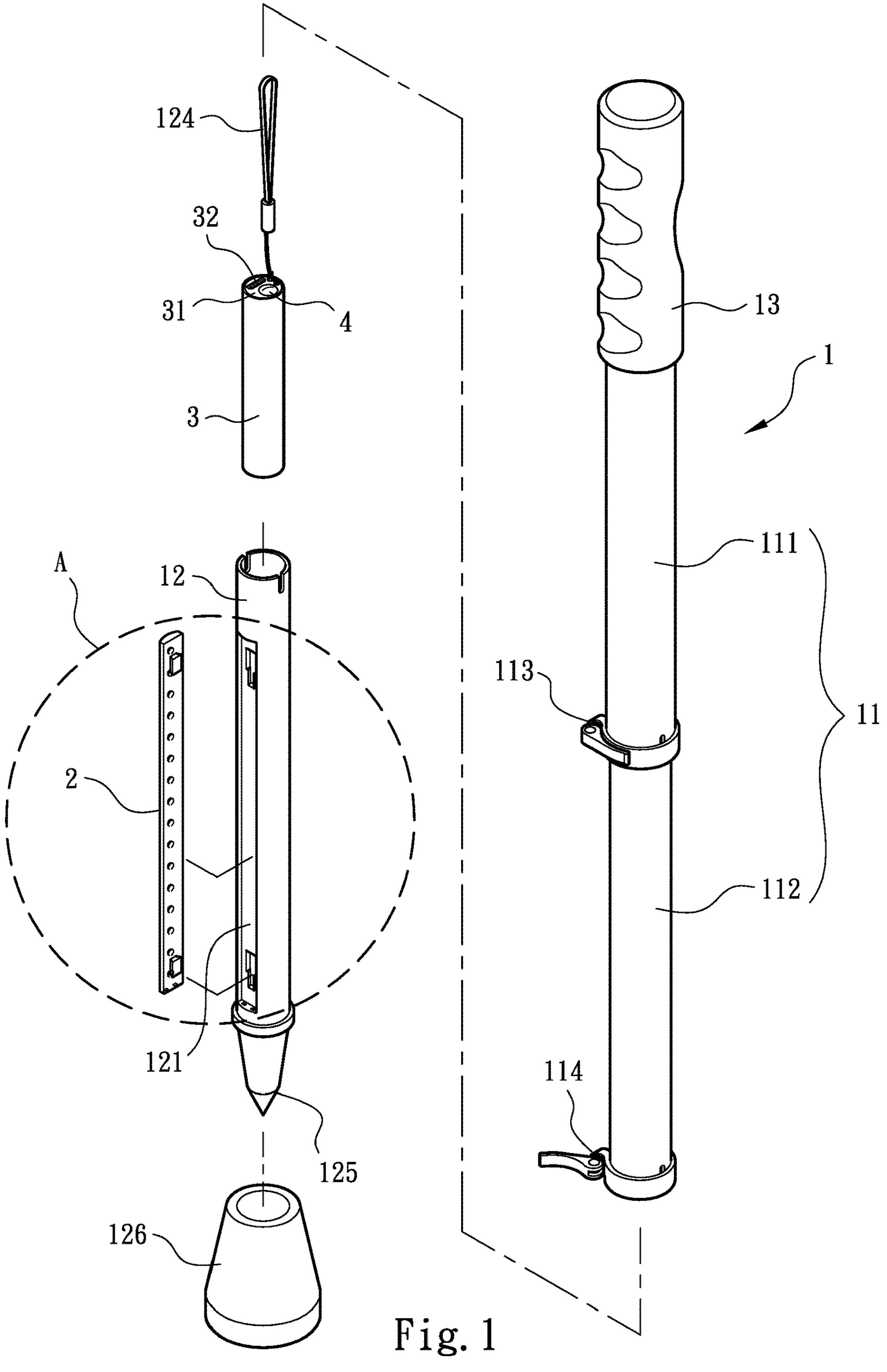
FIG. 1 is an exploded view of a first embodiment of the present invention.
Figure 2:
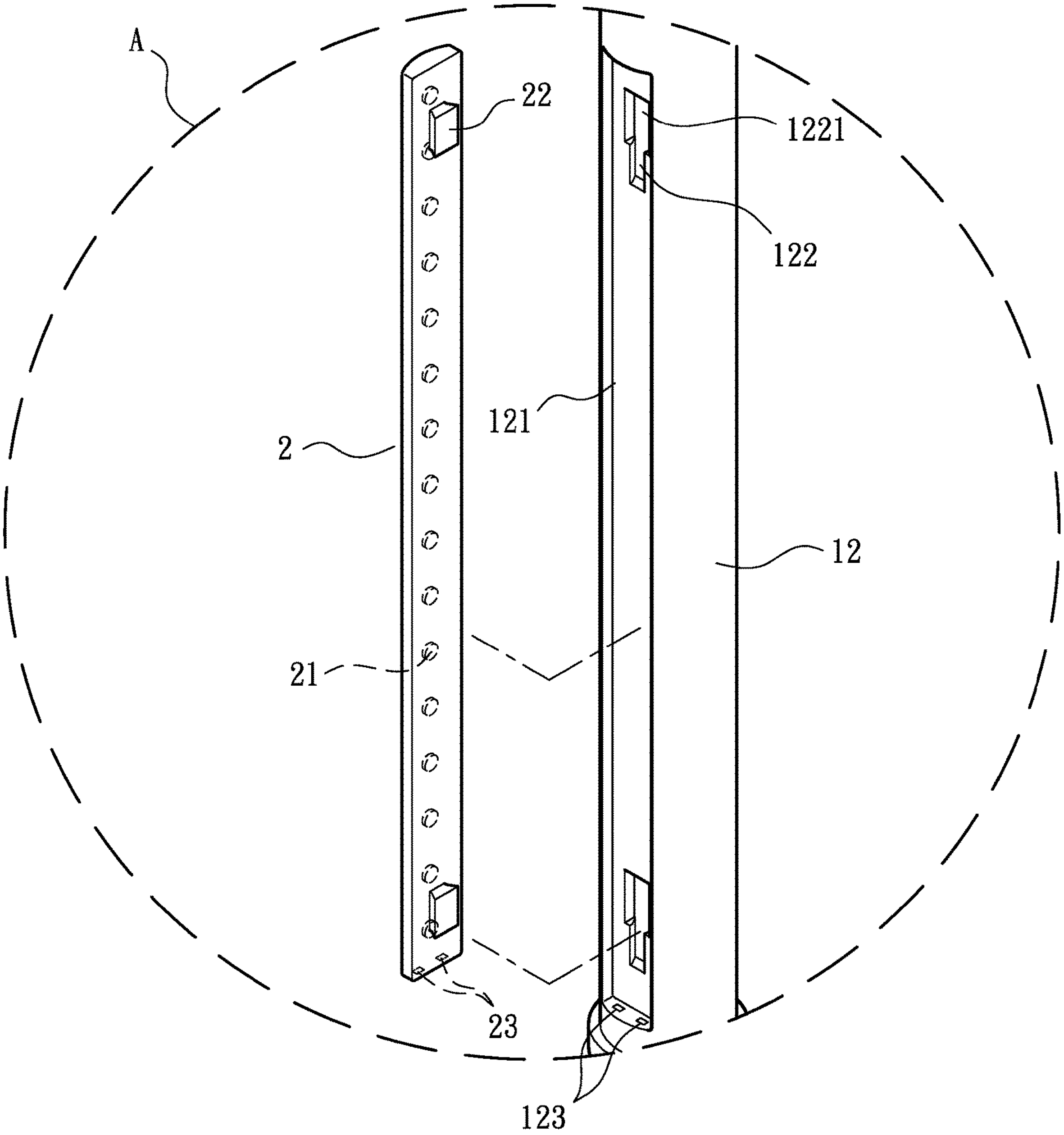
FIG. 2 is an enlarged view of circle A of FIG. 1.
Figure 3:
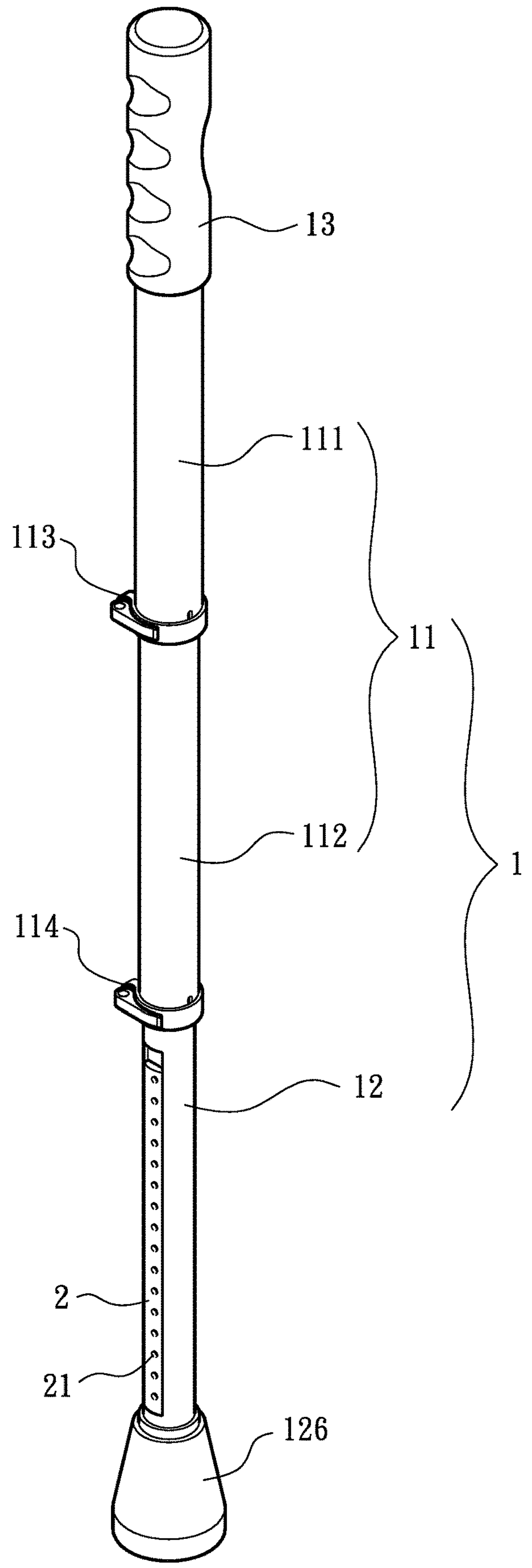
FIG. 3 is a perspective view of the first embodiment of the present invention in a fully extended state.
Figure 4:
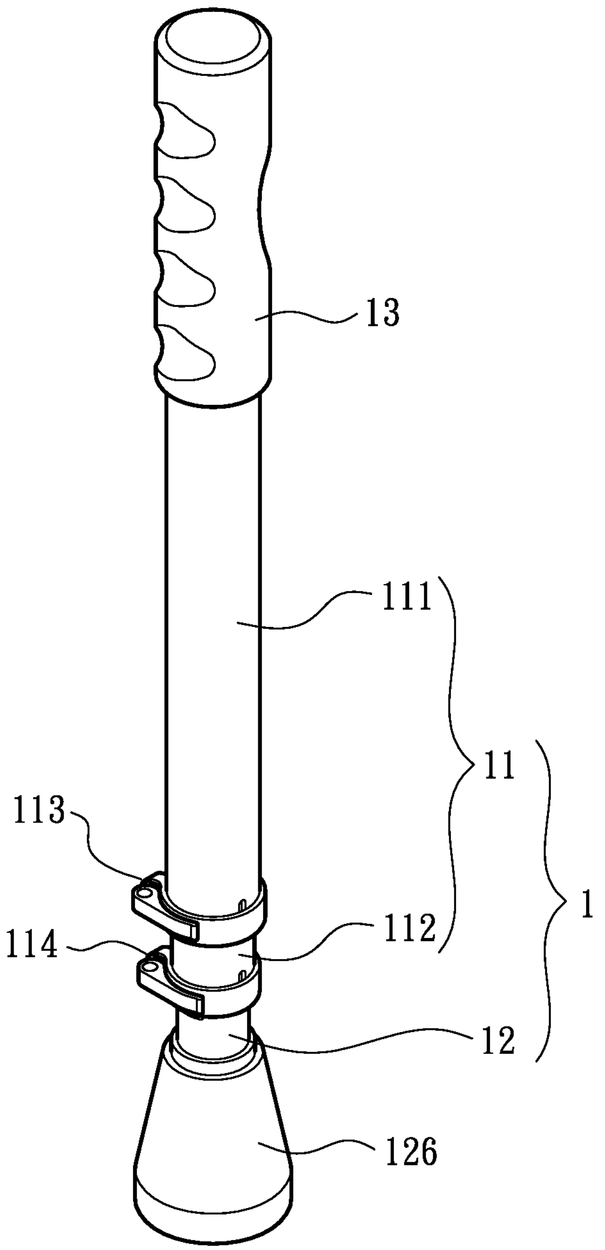
FIG. 4 is a perspective view of the first embodiment of the present invention in a fully retracted state.

Referring to FIG. 1 to FIG. 4, a telescopic lighting structure according to a first embodiment of the present invention comprises a telescopic rod 1, a light-emitting module 2, a power supply assembly 3, and a power switch 4. The telescopic rod 1 has a rod body 11 and a terminal rod 12. The rod body 11 is composed of a plurality of rods 111, 112 that are connected and retractable. The terminal rod 12 is detachably connected to one end of the rod body 11 (close to the rod 112). The terminal rod 12 can be telescoped into the rod body 11 as needed.

In a feasible embodiment, a quick release clamp 113 is provided on one end of the rod 111, close to the rod 112 for clamping the rods tightly. The rods 111, 112 can be positioned at a predetermined position to adjust the telescopic length of the rod body 11. A quick release clamp 114 is provided on one end of the rod 112, away from the rod 111 for clamping the terminal rod 12 tightly at a predetermined position to adjust the overall telescopic length of the telescopic rod 1.

In the above structure, the peripheral side surface of the terminal rod 12 has an accommodating recess 121 for accommodating the light-emitting module 2. At least one first coupling portion 122 is provided in the accommodating recess 121. The first coupling portion 122 may be an adhesive member or a groove (such as a dovetail groove). If the first coupling portion 122 is in the form of a groove (dovetail groove), one end of the first coupling portion 122 may be recessed to form a receiving opening 1221.

In practical application, a grip 13 is provided on one end of the rod body 11, away from the terminal rod 12, for easy holding as needed. One end of the terminal rod 12, away from the rod body 11, has a tip 125 with a tapering outer diameter. The outside of the tip 125 may be fitted with a cover 126 as needed.

The light-emitting module 2 is disposed in the accommodating recess 121 of the terminal rod 12. The light-emitting module 2 does not protrude beyond the surface of the terminal rod 12, so that the light-emitting module 2 can be received in the rod body 11 along with the terminal rod 12. The light-emitting module 2 has a light-emitting element 21 that can generate illumination light after being powered on.

In a feasible embodiment, the light-emitting module 2 has at least one second coupling portion 22. The second coupling portion 22 is coupled to the first coupling portion 122. The second coupling portion 22 may be an adhesive member or a plug-in member (such as a dovetail tenon) that can be coupled to the first coupling portion 122 (dovetail groove). In assembly, the second coupling portion 22 (dovetail tenon) is first inserted into the receiving opening 1221 and then moved to the first coupling portion 122 (dovetail groove), so that the light-emitting module 2 is secured in the accommodating recess 121.

The power supply assembly 3 is located inside the terminal rod 12, and is controlled by the power switch 4 to supply the required electric energy to the light-emitting element 21. One end of the power supply assembly 3, close to the rod body 11, has an end face 31 exposed outside the end of the terminal rod 12. The end face 31 has at least one charging port 32 for an external power supply to be plugged in the charging port 32.

In the above structure, the accommodating recess 121 has at least one set of internal conductive contacts 123 connected with the power supply assembly 3. The light-emitting module 2 has at least one set of external conductive contacts 23 connected with the light-emitting element 21. When the light-emitting module 2 is positioned in the accommodating recess 121, the internal contacts 123 are in contact with the external conductive contacts 23, so that the light-emitting element 21 is connected to the power supply assembly 3. In this embodiment, the power switch 4 is disposed on the end face 31 of the power supply assembly 3. The power switch 4 may be directly disposed on the end face of one end of the terminal rod 12, close to the rod body 11. A sling ring 124 with a loop may be coupled to the end face 31 of the power supply assembly 3 (or the terminal rod 12) as needed.

In normal use, when the telescopic rod 1 is fully stretched (the rod body 11 and the terminal rod 12 are secured at the fully extended length), the operator can hold the grip 13 to form a cane structure. At this time, the light-emitting module 2 is completely exposed outside the rod body 11. The power supply assembly 3 may energize each light-emitting element 21 via the power switch 4, so that the light-emitting module 2 may generate light outwards for illumination or warning while the telescopic rod 1 (cane) is being used. When not in use, the telescopic rod 1 has the shortest length after it is fully telescoped (the terminal rod 12 is telescoped into the rod body 11) to facilitate storage.

Figure 5:
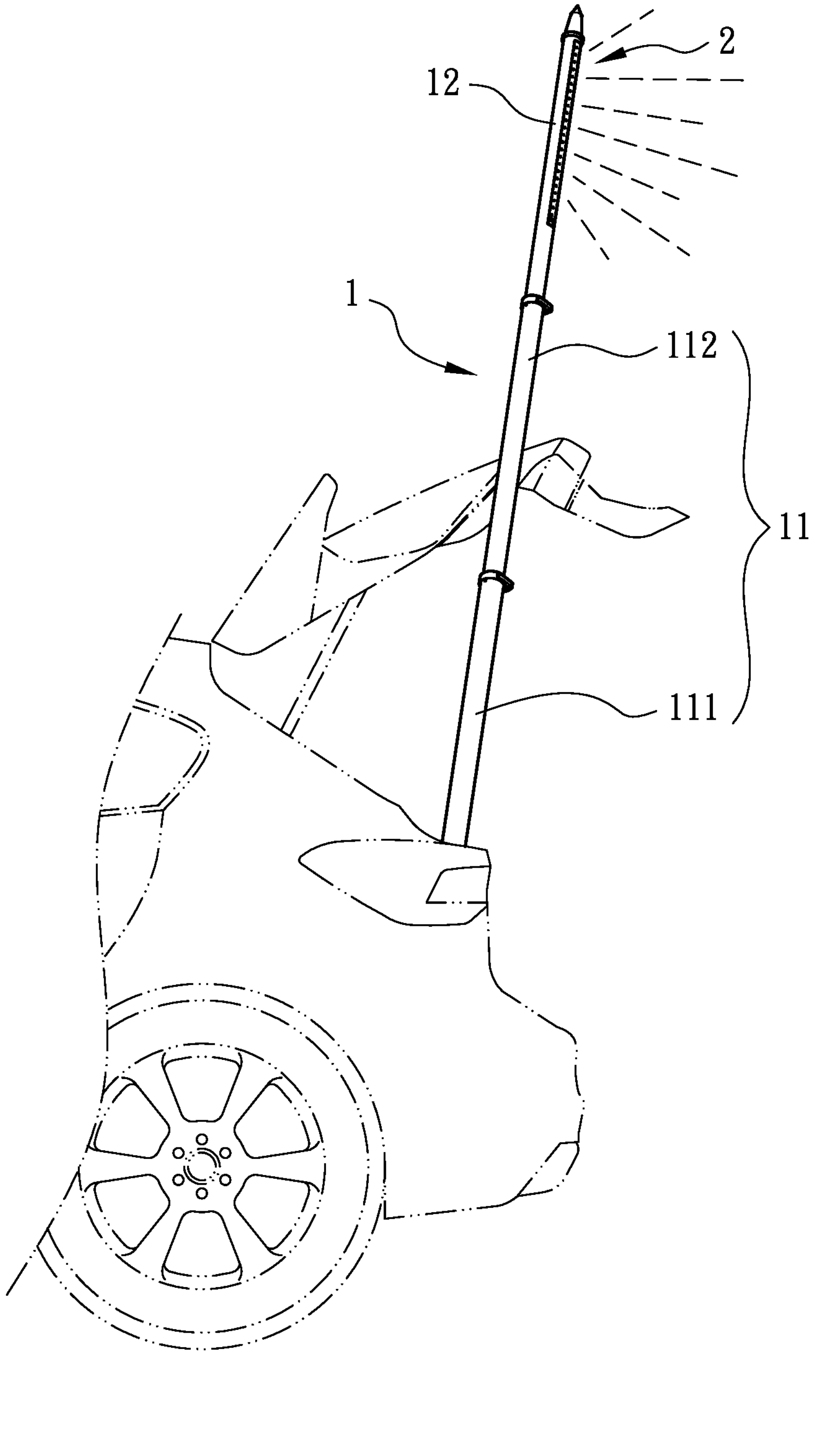
FIG. 5 is a first schematic view illustrating the use of the first embodiment of the present invention when in use.
Figure 6:
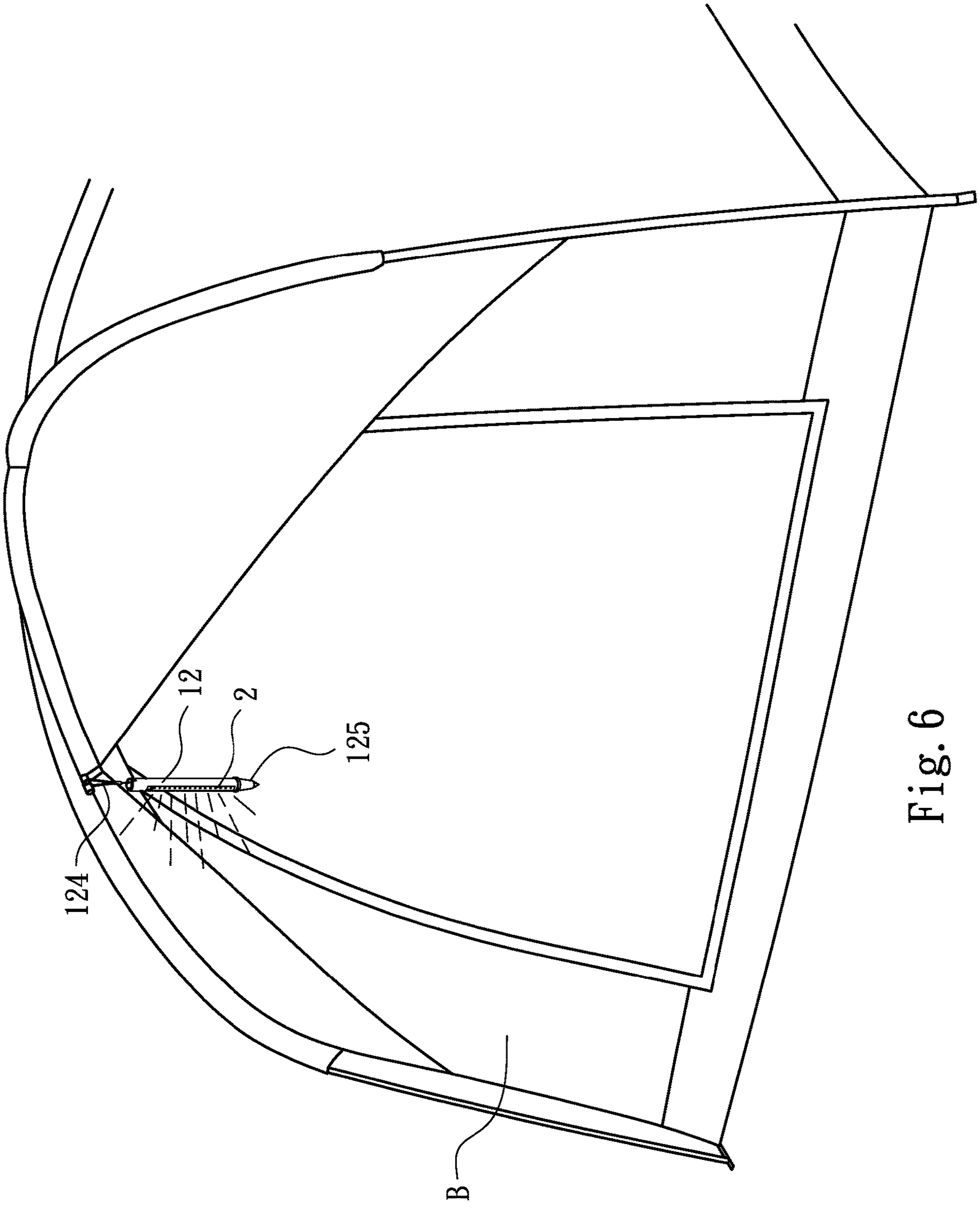
FIG. 6 is a second schematic view illustrating the use of the first embodiment of the present invention when in use.
Figure 7:
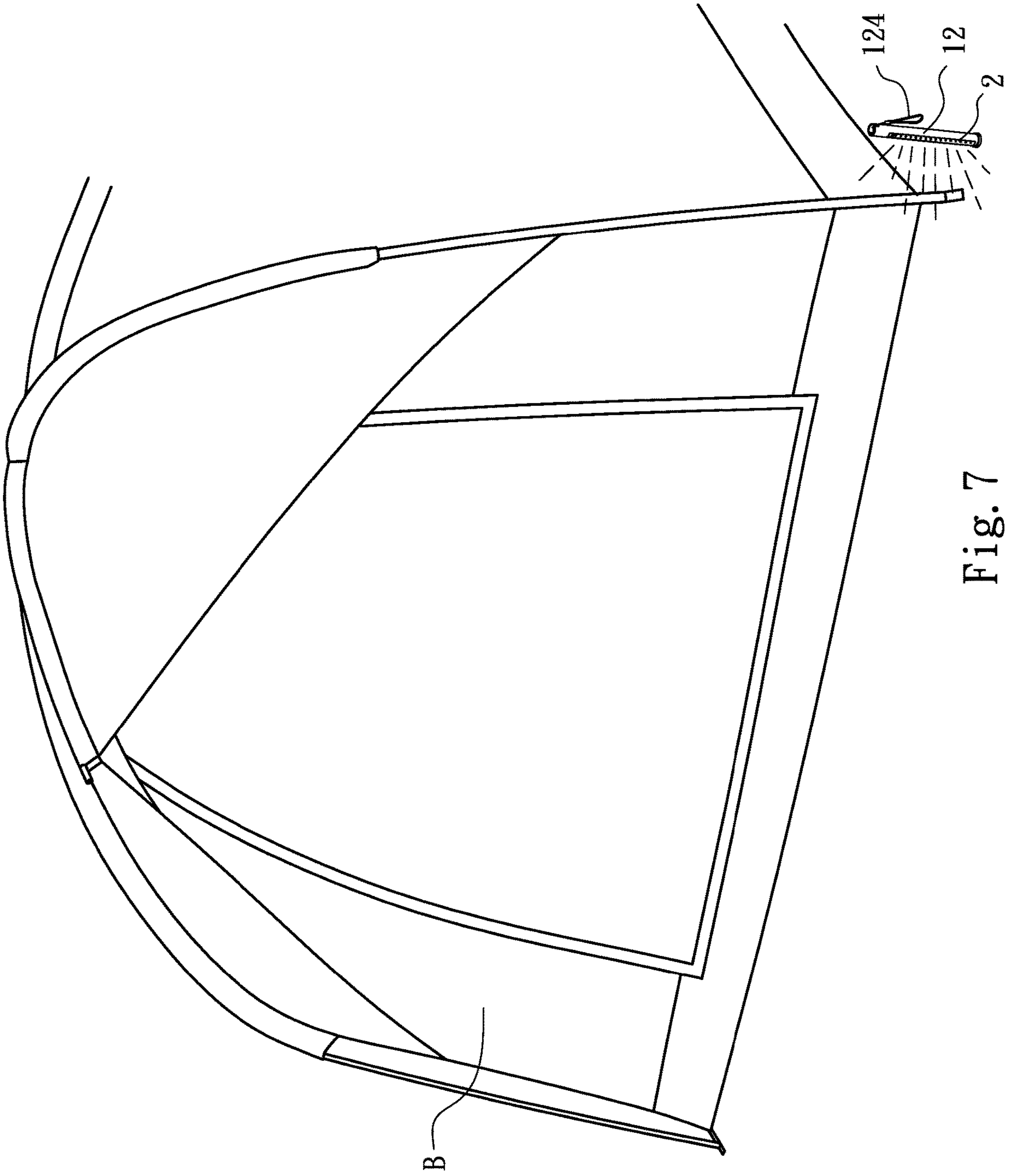
FIG. 7 is a third schematic view illustrating the use of the first embodiment of the present invention when in use.

FIG. 5, FIG. 6 and FIG. 7 illustrate the actual application of the structure of the first embodiment of the present invention. The telescopic rod 1 is fully stretched and the end having the terminal rod 12 faces upward, so that the light-emitting module 2 is supported and lifted to a higher position to provide extended distance illumination or warning needs for different emergency scenarios (such as signs/calls for help at the scene of a car accident, as shown in FIG. 5, or at other unobservable scenes).

If the terminal rod 12 is separated from the rod body 11, a separate light source mechanism is formed. At this time, the terminal rod 12 is suspended at a predetermined height (for example, the terminal rod 12 is suspended on the top of a tent B, as shown in FIG. 6) via the sling ring 124, to form an application that generates a warning or illumination light in the air in all directions. Alternatively, the tip 125 of the terminal rod 12 is inserted into the ground in a predetermined area (such as one side of the tent B shown in FIG. 7), to generate a warning or illumination light on the ground in the area.

Figure 8:
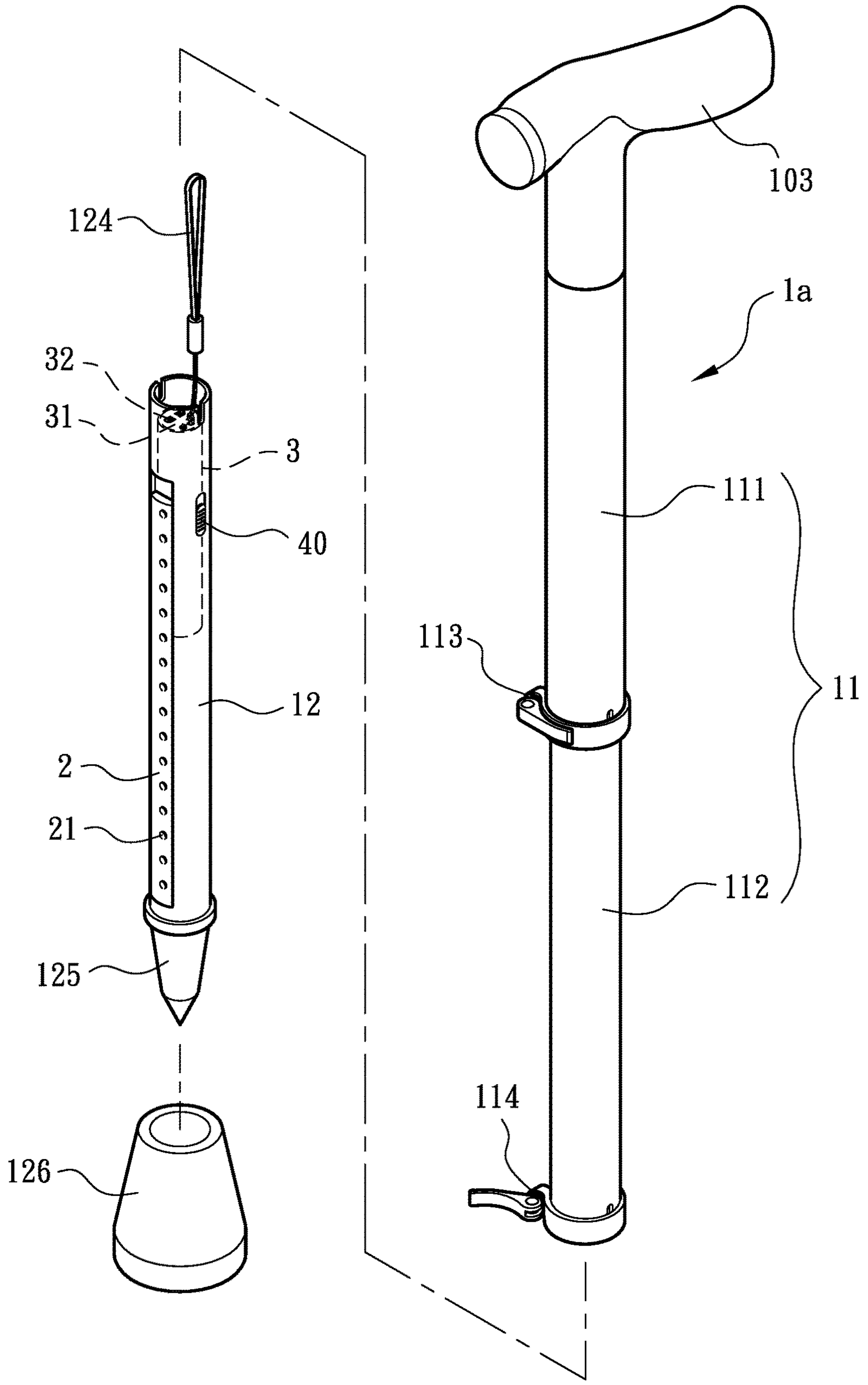
FIG. 8 is an exploded view of a second embodiment of the present invention.

Referring to FIG. 8, a telescopic lighting structure according to a second embodiment of the present invention comprises a telescopic rod 1*a* and a power switch 40 as well as the light-emitting module 2 and the power supply assembly 3 that are the same as the first embodiment. The telescopic rod 1*a* has a rod body 11 and a terminal rod 12 that are the same as the first embodiment. The terminal rod 12 is connected to one end of the rod body 11. The light-emitting module 2 and the power supply assembly 3 are assembled in the terminal rod 12 in the same manner as the first embodiment.

In the second embodiment, the power switch 40 is directly disposed on the peripheral side surface between the two ends of the terminal rod 12 and does not protrude beyond the surface of the terminal rod 12. A different grip 103 is provided on one end of the rod body 11, away from the terminal rod 12. Since the power switch 40 and the light-emitting module 2 are both kept in a position that does not protrude beyond the surface of the terminal rod 12, they will not affect the telescopic action of the terminal rod 12 into the rod body 11. When the terminal rod 12 is in a position outside the rod body 11 (or the terminal rod 12 is separated from the rod body 11), since the power switch 40 is exposed outside the rod body 11, it is easy to control the conduction between the power supply assembly 3 and each light-emitting element 21, forming an easier-to-operate application. Apart from this, the connection and operational relationship between the rod body 11, the terminal rod 12 and related components are the same as those in the first embodiment, and will not be described in detail herein.

Figure 9:
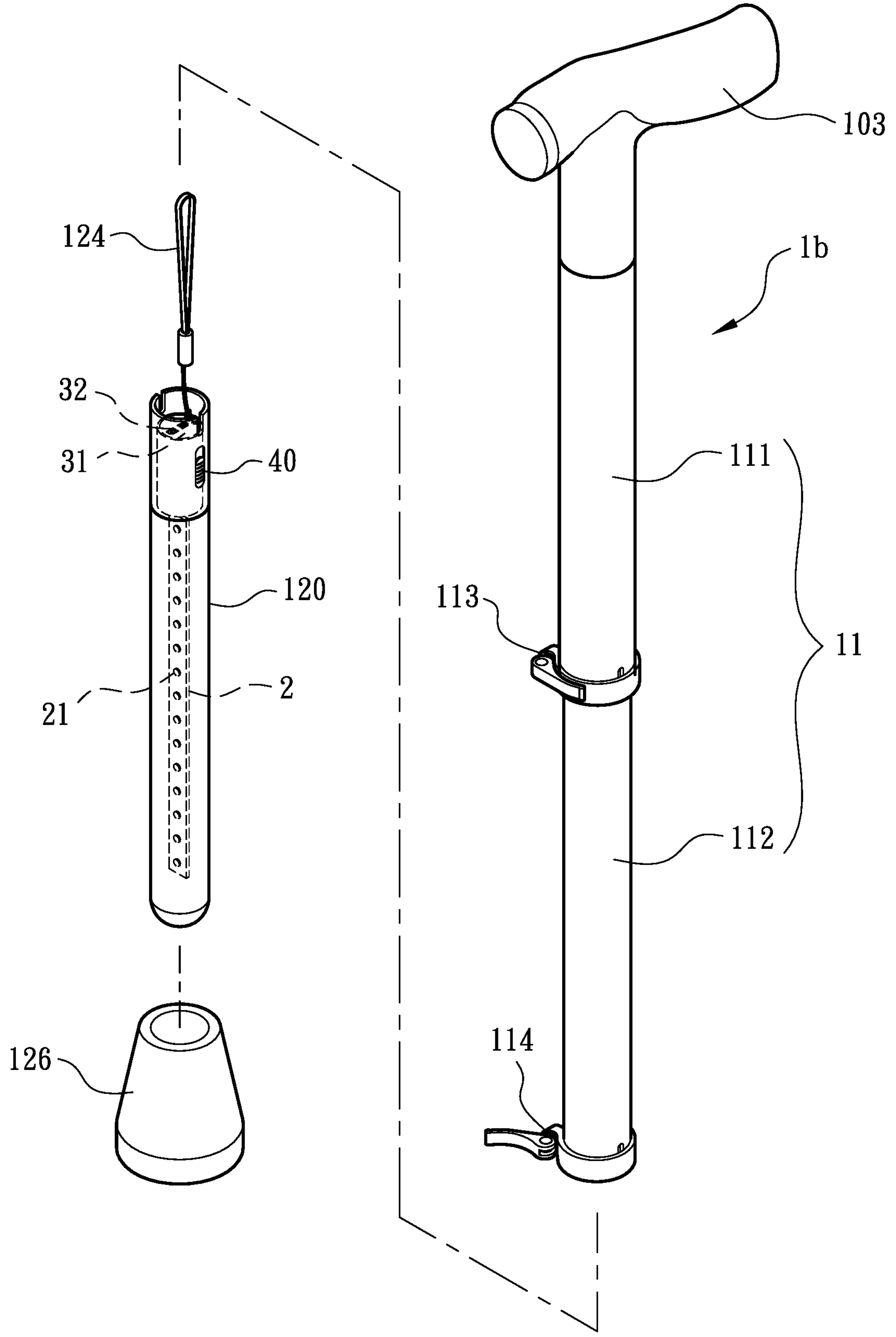
FIG. 9 is an exploded view of a third embodiment of the present invention.

Referring to FIG. 9, a telescopic lighting structure according to a third embodiment of the present invention comprises a telescopic rod 1*b* as well as the light-emitting module 2, the power supply assembly 3 and the power switch 40 that are the same as the second embodiment. The telescopic rod 1*b* has a terminal rod 120 as well as the rod body 11 and the grip 103 that are the same as the second embodiment. The terminal rod 120 is connected to one end of the rod body 11, away from the grip 103. The power switch 40 and the power supply assembly 3 are assembled in the terminal rod 120 in the same manner as the second embodiment.

In the third embodiment, the circumference of at least part of the terminal rod 120 is made of a light-pervious or transparent material. The light-emitting module 2 is disposed inside the terminal rod 120. (It may be in the form of a light tube.) Since the circumference of at least part of the terminal rod 120 has light-pervious or transparent properties, the light generated by the light-emitting module 2 can be directly projected outwards throughout the circumference. Therefore, there is no need to provide related structures, such as the aforementioned accommodating recess 121, the first coupling portion 122 and the second coupling portion 22, outside the terminal rod 120. This can simplify the overall structural design and development costs effectively.

Figure 10:
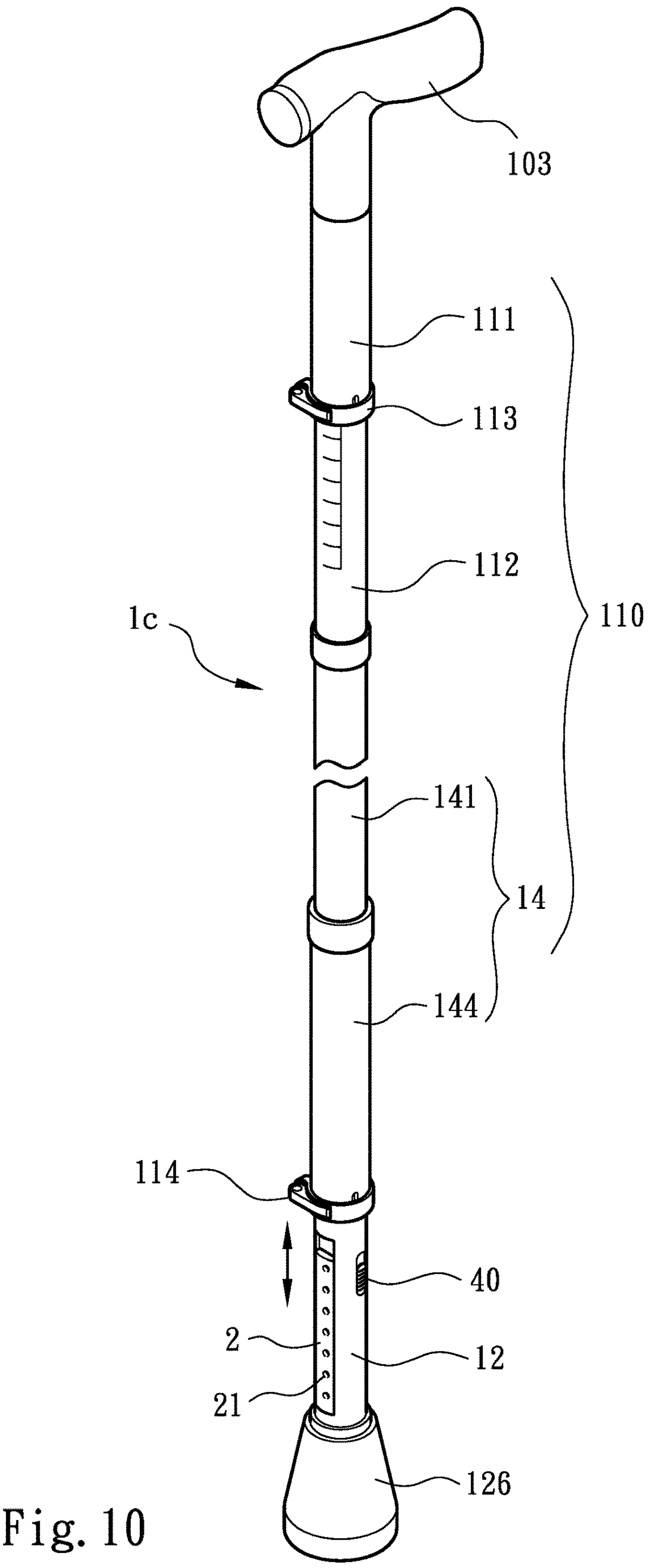
FIG. 10 is a perspective view of a fourth embodiment of the present invention in a fully extended state.
Figure 11:
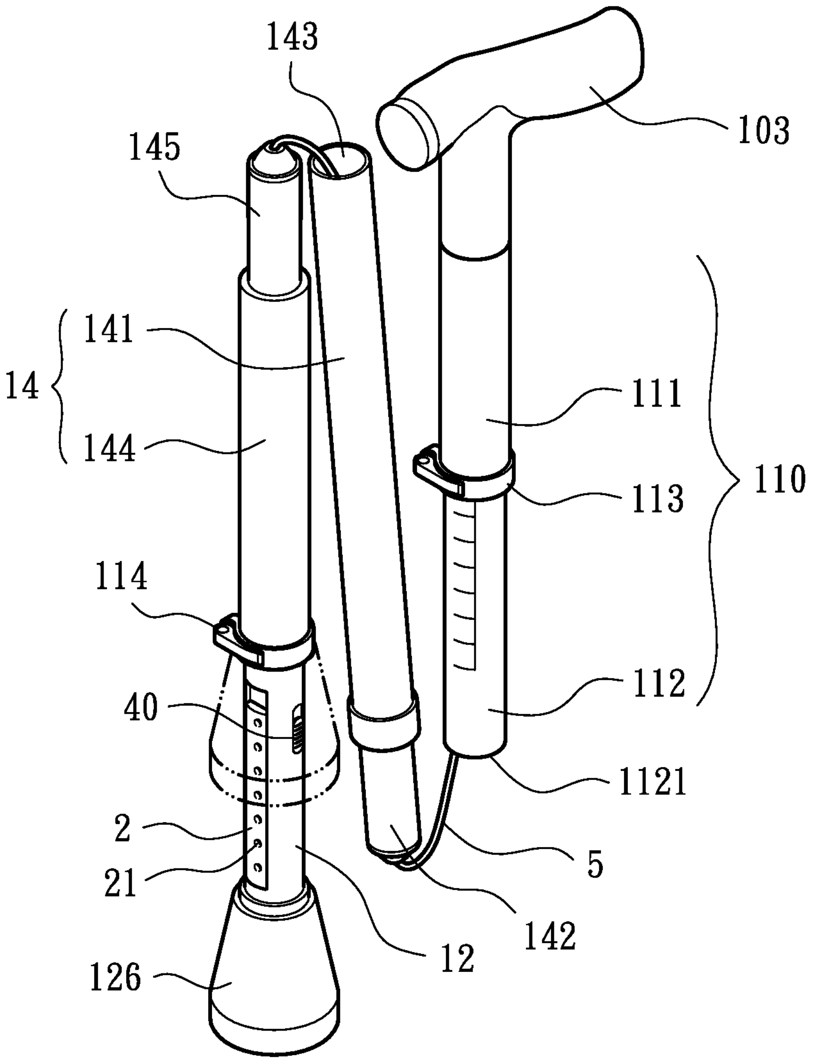
FIG. 11 is a perspective view of the fourth embodiment of the present invention in a folded state.

Referring to FIG. 10 and FIG. 11, a telescopic lighting structure according to a fourth embodiment of the present invention comprises a telescopic rod 1*c* as well as the light-emitting module 2, the power supply assembly 3 and the power switch 40 that are the same as the second embodiment. The telescopic rod 1*c* has a rod body 110 as well as the terminal rod 12 that is the same as the second embodiment.

In the fourth embodiment, the rod body 110 has a connecting rod assembly 14 as well as the rods 111, 112 that are the same as the second embodiment. The connecting rod assembly 14 is composed of at least one connecting rod 141 and a sleeve rod 144. Two ends of the connecting rod 141 are defined as a plug portion 142 and a socket end 143, respectively. One end of the rod 112, away from the rod 111, is defined as a socket end 1121 for connection of the plug portion 142. One end of the sleeve rod 144 is telescopically fitted to the terminal rod 12. The quick release clamp 114 is disposed on one end of the sleeve rod 144, close to the terminal rod 12, so that the terminal rod 12 and the sleeve rod 144 can be positioned at a predetermined telescopic length as needed. The other end of the sleeve rod 144 is defined as a plug portion 145. The plug portion 145 is inserted into the socket end 143 to form a connection. The rods 111, 112, the connecting rod 141, the sleeve rod 144 and the terminal rod 12 are connected in sequence to form the telescopic rod 1*c* (as shown in FIG. 10). The light-emitting module 2, the power supply assembly 3 and the power switch 40 are assembled in the terminal rod 12 in the same manner as the second embodiment.

In the above structure, a connecting cable 5 passing through the connecting rod 141 is connected between the socket end 1121 and the plug portion 145, such that after the connecting rod 141, the sleeve rod 144 and the terminal rod 12 are detached from the connected rods 111, 112, they can be folded and connected by the connecting cable 5 without being scattered (as shown in FIG. 11), so as to facilitate storage.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A telescopic lighting structure, comprising:

a telescopic rod, said telescopic rod having a rod body and a terminal rod, wherein said terminal rod has a cylindrically shaped wall with a longitudinally extending accommodating recess formed in said wall, the terminal rod being detachably connected to one end of the rod body, the terminal rod being selectively telescoped into the rod body;

a light-emitting module, said light-emitting module having an elongated shape corresponding to said longitudinally extending accommodating recess, wherein said light-emitting module is disposed in said accommodating recess substantially flush with said wall of said terminal rod and in the longitudinal relationship with said terminal rod, the light-emitting module being selectively telescoped into the rod body along with the terminal rod, without causing any interference or obstruction to the rod body, the light-emitting module having a light-emitting element to generate illumination light after being powered on;

a power supply assembly capable of storing electric energy, disposed inside the terminal rod, the power supply assembly being controlled by a power switch installed on the terminal rod for supplying the required electric energy to the light-emitting element.

2. The telescopic lighting structure as claimed in claim 1, wherein the light-emitting module is disposed on a peripheral side surface of the terminal rod.

3. A telescopic lighting structure, comprising:

a telescopic rod, having a rod body and a terminal rod, the terminal rod being detachably connected to one end of the rod body, the terminal rod being selectively telescoped into the rod body;

a light-emitting module, disposed on a peripheral side of the terminal rod, the light-emitting module being selectively telescoped into the rod body along with the terminal rod, without causing any interference or obstruction to the rod body, the light-emitting module having a light-emitting element to generate illumination light after being powered on; and a power supply assembly capable of storing electric energy, disposed inside the terminal rod, the power supply assembly being controlled by a power switch installed on the terminal rod for supplying the required electric energy to the light-emitting element, wherein the peripheral side surface of the terminal rod has an accommodating recess for accommodating the light-emitting module, wherein a first coupling portion and a second coupling portion are provided between the light-emitting module and the accommodating recess of the terminal rod, and the first coupling portion and the second coupling portion are connected to each other.

4. The telescopic lighting structure as claimed in claim 3, wherein the accommodating recess has at least one set of internal conductive contacts connected with the power supply assembly; the light-emitting module has at least one set of external conductive contacts connected with the light-emitting element; when the light-emitting module is positioned in the accommodating recess, the internal contacts are in contact with the external conductive contacts, so that the light-emitting element is connected to the power supply assembly.

5. The telescopic lighting structure as claimed in claim 1, wherein the terminal rod is a light-pervious structure, and the light-emitting module is disposed inside the terminal rod.

6. The telescopic lighting structure as claimed in claim 1, wherein one end of the power supply assembly, close to the rod body, has an end face, the end face is exposed outside the terminal rod, and at least one of the power switch and a charging port is disposed on the end face.

7. The telescopic lighting structure as claimed in claim 1, wherein at least one of the power switch and a charging port is disposed on the peripheral side surface between two ends of the terminal rod and does not protrude beyond the surface of the terminal rod.

8. The telescopic lighting structure as claimed in claim 1, wherein a sling ring with a loop is coupled to the terminal rod.

9. The telescopic lighting structure as claimed in claim 6, wherein a sling ring with a loop is coupled to the terminal rod.

10. The telescopic lighting structure as claimed in claim 7, wherein a sling ring with a loop is coupled to the terminal rod.

11. The telescopic lighting structure as claimed in claim 1, wherein one end of the terminal rod, away from the rod body, has a tip with a tapering outer diameter, the tip is fitted with a cover.

12. The telescopic lighting structure as claimed in claim 6, wherein one end of the terminal rod, away from the rod body, has a tip with a tapering outer diameter, the tip is fitted with a cover.

13. The telescopic lighting structure as claimed in claim 7, wherein one end of the terminal rod, away from the rod body, has a tip with a tapering outer diameter, the tip is fitted with a cover.

14. The telescopic lighting structure as claimed in claim 8, wherein one end of the terminal rod, away from the rod body, has a tip with a tapering outer diameter, the tip is fitted with a cover.

15. The telescopic lighting structure as claimed in claim 1, wherein the rod body is selected from one of a multi-section telescopic rod structure and a multi-section connected rod structure.

16. The telescopic lighting structure as claimed in claim 6, wherein the rod body is selected from one of a multi-section telescopic rod structure and a multi-section connected rod structure.

17. The telescopic lighting structure as claimed in claim 7, wherein the rod body is selected from one of a multi-section telescopic rod structure and a multi-section connected rod structure.

18. The telescopic lighting structure as claimed in claim 8, wherein the rod body is selected from one of a multi-section telescopic rod structure and a multi-section connected rod structure.

19. The telescopic lighting structure as claimed in claim 9, wherein the rod body is selected from one of a multi-section telescopic rod structure and a multi-section connected rod structure.

* * * * *